Feb. 18, 1947.   H. A. BISSOUT ET AL   2,415,987
APPARATUS FOR BUTT WELDING
Filed May 27, 1943   3 Sheets-Sheet 1

Inventors.
Herbert A. Bissout and
William Y. Borresen
by
Attorneys.

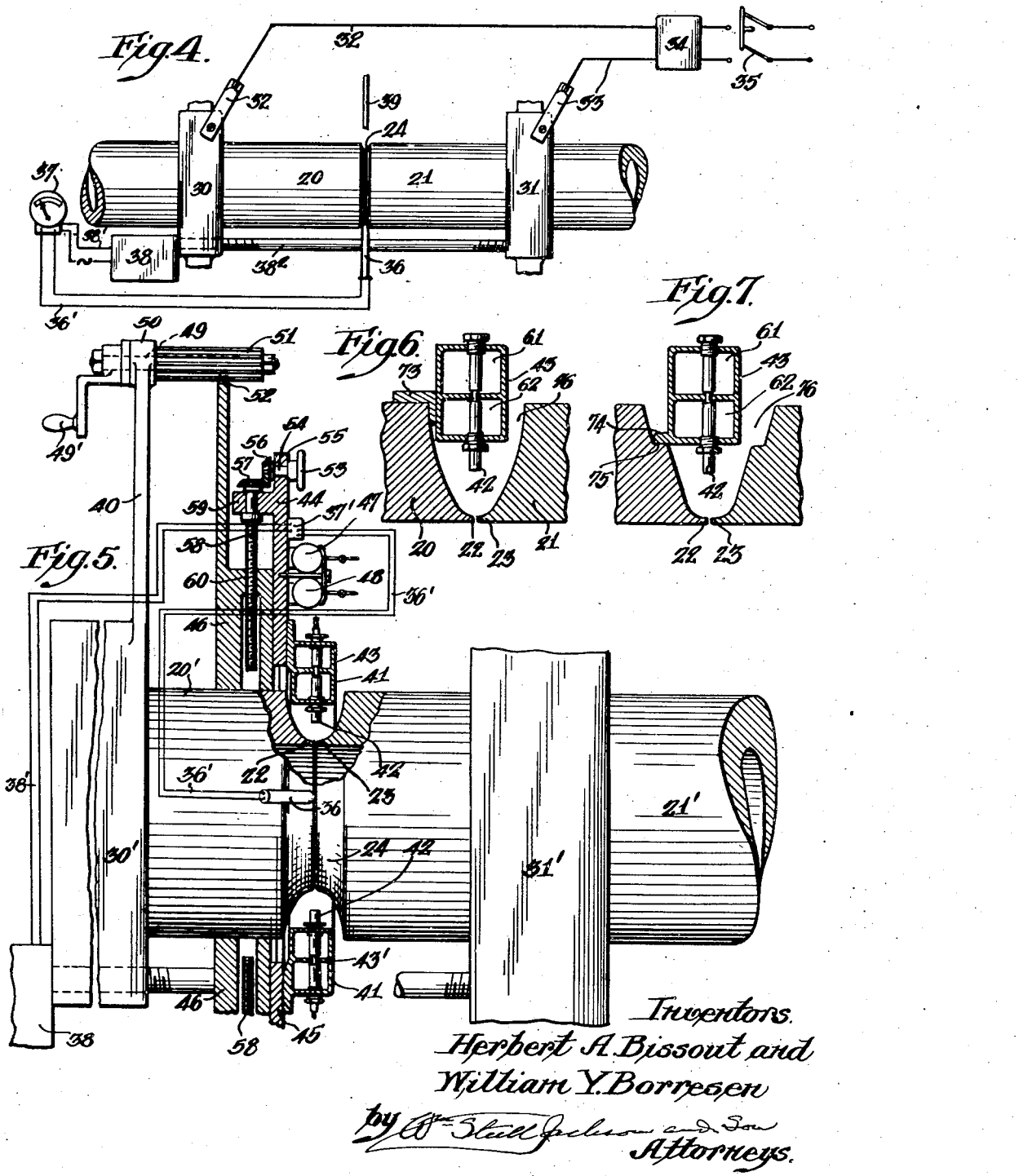

Feb. 18, 1947.  H. A. BISSOUT ET AL  2,415,987
APPARATUS FOR BUTT WELDING
Filed May 27, 1943  3 Sheets-Sheet 3
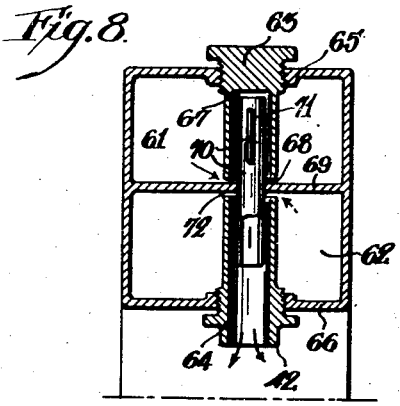
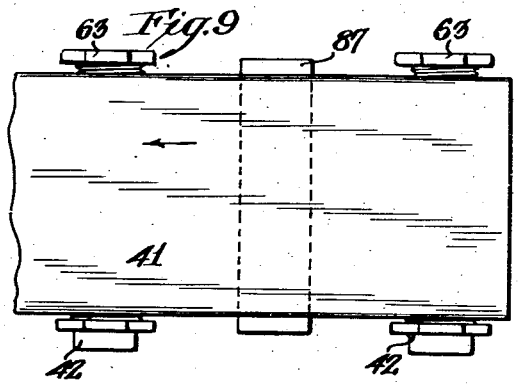
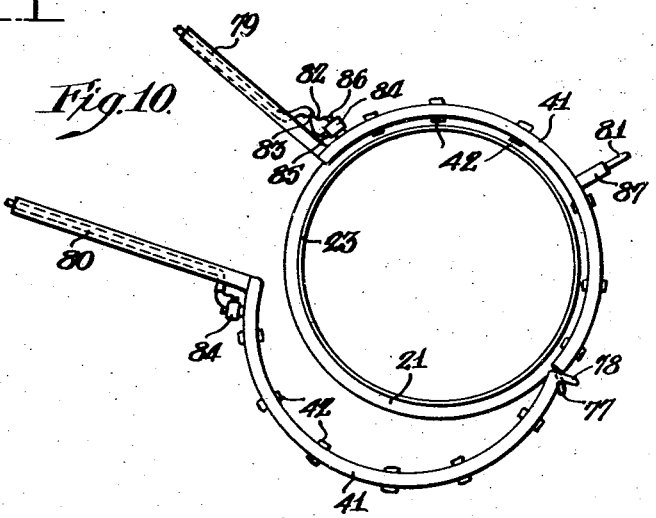
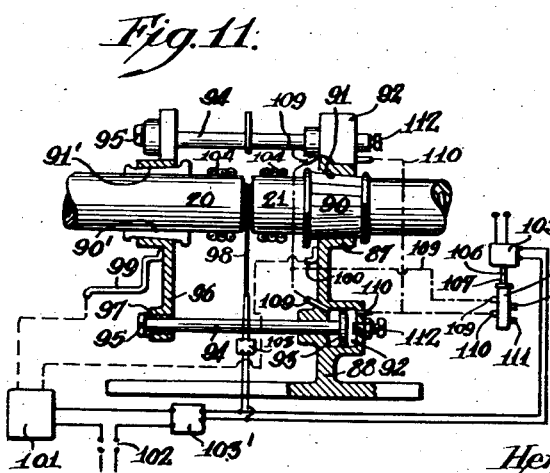
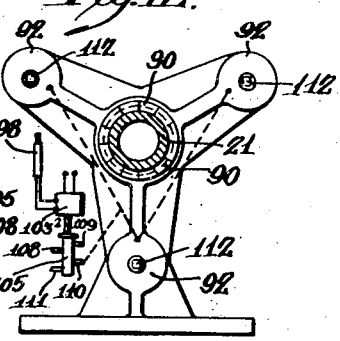
Inventor
Herbert A. Bissout and
William Y. Borresen
by
Attorneys.

Patented Feb. 18, 1947

2,415,987

UNITED STATES PATENT OFFICE 2,415,987

APPARATUS FOR BUTT WELDING

Herbert A. Bissout, Merchantville, N. J., and William Y. Borresen, Philadelphia, Pa., assignors to W. K. Mitchell & Company, Inc., Philadelphia, Pa., a corporation of Pennsylvania Application May 27, 1943, Serial No. 488,657

5 Claims. (Cl. 219—4)

The present invention relates to apparatus for butt welding of metal pipe at a welding groove or scarf provided by the opposing formed edges of pipe positioned for welding.

This application is a continuation in part of our applications Serial No. 308,974, filed December 13, 1939, issued June 6, 1944, as Patent No. 2,350,716, for Welding apparatus, and Serial No. 355,578, filed September 6, 1940, for Welding process.

The ends of the pipe or the like are formed to provide a preferably U-shaped weld groove at the ends with thin opposing lips along the inside, meeting in straight abutting ends.

A purpose of the invention is to obtain better welding between the lips and avoid fins inside the weld in butt welding pipe.

A further purpose is to combine lip metal welding of straight-ended abutting lips in pipe with welding rod metal welding above the lips.

A further purpose is to use a pyrometer control in the pressure welding of the lips in lip-to-lip weld members to be united above the lips by arc welding.

A further purpose is to heat and pressure weld the lips without added weld metal and thereafter to electric arc weld the edges along the groove portions above the lips.

A further purpose is to avoid the presence of welding rod metal in the portion of a welded transverse pipe joint which contacts the medium carried by the pipe.

A further purpose is to combine lip-metal welding of the lips with electrode-metal welding above the lips.

A further purpose is to improve corrosion resistance in a welded joint.

A further purpose is to produce butt-welded joints between the ends of pipes of thick section without the necessity for large investment in flash welding equipment.

A further purpose is to heat the straight-ended abutting lips of a pipe joint alternatively by the electric resistance of the lips and of the contacts between the lips or by combustion from an annular burner surrounding the lips, suitably an oxyacetylene burner.

A further purpose is to provide automatic control for pressure welding in which the parts to be pressed together are the parts ultimately to be welded and in which the pressure is not applied until the temperature has reached the welding temperature.

A further purpose is to provide an automatic control of pressure welding which is equally applicable to electric and to gas welding.

Further purposes will appear in the specification and in the claims.

We have elected to illustrate the invention in a few only of its many forms; selecting forms however that are practical and efficient in operation and which well illustrate the principles involved.

Figures 1a, 2a, 3a, 1b, 2b, 3b and 1c, 2c and 3c are longitudinal plane sections which illustrate our welding process at a few of many different forms of weld grooves. The subscripts a, b and c show respectively different forms of outside weld grooves of thick pipe weld members.

Figure 4 is a diagrammatic longitudinal view illustrating the process applied to butt welding pipe members and with electric flash heating of the lips.

Figure 5 is an enlarged scale fragmentary view intended to show somewhat diagrammatically structure for carrying out the process on pipe welding with burner heating of the lips and with diagrammatic control of the pressure.

Figures 6 and 7 are fragmentary vertical sections showing a suitable burner in guide relation to somewhat different forms of weld grooves.

Figure 8 is an enlarged sectional fragment that may be either of Figure 6 or of Figure 7.

Figure 9 is a fragmentary side elevation, in part section, of the structure of Figure 8 showing spaced burner nozzles and a tubular mount for a pyrometer to show the degree of heating of the opposing lips.

Figure 10 is a reduced scale elevation of a different way of applying and using our divided burners, showing the burners at a weld groove with one of the divided burners not yet closed to its heating position.

Figures 11 and 12 are respectively a longitudinal section and a transverse section which illustrate partly diagrammatically a different structure for carrying out the present invention, with structure for pressing the lip-to-lip members together and showing diagrammatically a pyrometer control of the degree of lip heating and of the start of pressure welding of the lips.

Like numerals refer to like parts in all figures.

Figure 1:
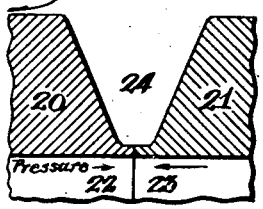
Figures 1, 2 and 3 are fragmentary longitudinal sections illustrating the application of our invention in welding a pipe at a conventional outside weld groove, the views showing successive stages of welding, respectively after placement of the weld members for lip welding, after lip welding and after completion of arc welding. The steps illustrated would be true also in case of gas welding.

The same drawings and descriptive matter with claims which were initially identical with the claims in the present case appear in a companion application filed by us for Process of and apparatus used for welding, Serial No. 488,658, filed May 27, 1943.

Describing in illustration and not in limitation and referring to the drawings:

In electric arc butt welding of thick pipes, pipe fittings or valves the weld members are first formed with thin projecting lips along their weld edges in such manner as to provide a weld groove or scarf between the members when the members are positioned for welding, lip-to-lip.

In the past the members have been placed for welding with a slight spacing between the opposing lips.

In the arc welding process the whole weld groove is progressively filled with electrode metal and hitherto one of the difficulties has been with the initial arc welding of the lips. If weld members are placed initially with the lips in contact, but without welding them together and the weld groove is filled with electrode metal, the weld between the lips is quite imperfect and when, as hitherto more usual, the weld members are placed with the lips somewhat spaced from one another, there is to less extent the same trouble with an added trouble of downward fins forming below the lips. This trouble is wholly overcome by initially heating the lips to weld temperature before they are pressed together and then pressure welding while the progressively crushed lips are maintained at welding temperature. This is true whether the welding be effected by electricity or by gas.

Where the arc welding of the lips has been imperfect, this has resulted in weakening the joint and providing a focus for corrosion or fatigue failure. At the other extreme, fins projecting from the lips into the pipe not only obstruct flow in the pipe, but are likely to break off and be carried by the medium in the pipe to pumps or other expensive equipment and there cause damage to moving parts.

One of the main objects of the present invention is to avoid these difficulties by pressure welding the lips without adding electrode weld metal prior to welding the main thickness of the joint by beads of welding rod, suitably from an arc welding electrode.

It has been proposed that joints between plates or longitudinal joints in pipe be formed by bevelling from both sides at the joint, fusion welding and then arc welding, or by bevelling entirely at one side, producing sharp points on the weld members, fusion welding and then arc welding. The form in which bevelling has been accomplished from both sides has the objection of exposing welding rod weld metal to the medium in a pipe, and has not been applied to butt welds between the ends of pipes, where the interior of the pipe is often inaccessible to the welder.

The form in which the bevelling to a sharp point is accomplished entirely from one side presents the objection that alignment of the sharp ends is difficult and excessive burning of the sharp ends is likely to occur, producing large interior fins which may break off and cause damage to machinery. This form also has not been applied to welding of joints in the ends of pipes, apparently because of these difficulties.

In Figure 1 the weld members 20 and 21 are shown in weld position with their edges formed for welding. In accord with our process the weld lips 22 and 23 at the bottom of the weld groove 24 are placed with the straight ends of the lips abutting and are uniformly heated in any suitable way to welding temperature. They are then pressure welded together by feeding the members 20, 21 one into the other, providing the result indicated in Figure 2 where the opposing lips have united along their length with slight outward and inward bulgings 25 and 26.

The scarf or welding groove will be preferably U-shaped, as shown, with the sloping side wall of the groove terminating at a point somewhat removed from the meeting ends of the lips, thus providing a substantial length for the lips and permitting compression or bulging of the lips in the process of pressure welding.

The weld is now completed by conventional welding with welding rod. It will be understood that any conventional preheating procedure will be used, with any suitable procedure to maintain the preheating temperature during intervals in welding of alloy steel or any other suitable metal.

Figure 2:
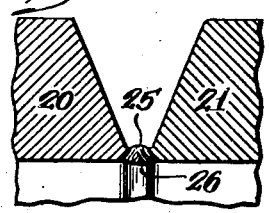
Figure 3:
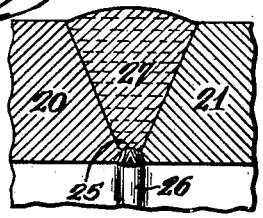
Figure 3:
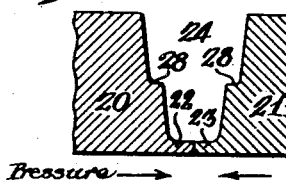
Figure 3:
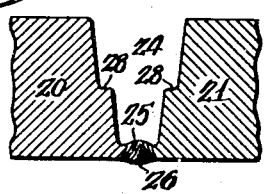
Figure 3:
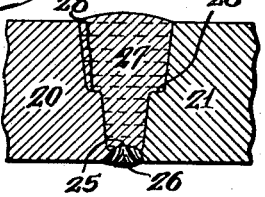
Figure 3:
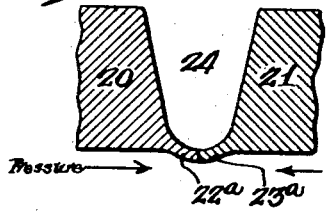
Figure 3:
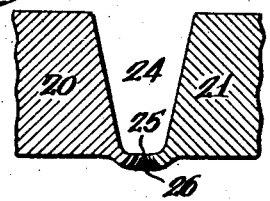
Figure 3:
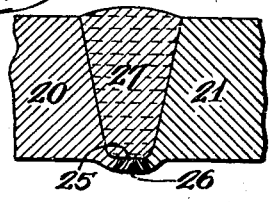
Figure 3:
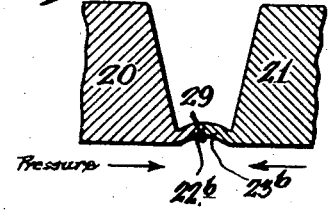
Figure 3:
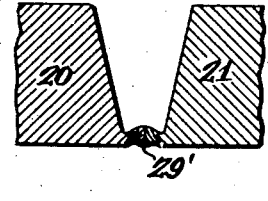
Figure 3:
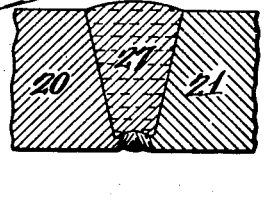

Several distinct advantages are apparent in the weld of Figures 1 to 3. No finning is likely to occur, as no added weld metal is present in the welding of the lips, and the lips will not be heated until their metal is very fluid as was the case when it was desired to penetrate welding rod metal between the lips. As already noted it is important that the lips have transversely straight ends rather than ends which are sharpened, as for example due to bevelling of the end of the pipe. If sharp meeting edges are provided misalignment of the abutting ends is easy and burning of the metal at the ends due to excessive current concentration or flame concentration at the meeting ends is likely to occur with the increased likelihood of forming fins in the interior of the weld. With straight abutting ends of the lips good electrical contact is assured where the heating for the automatically controlled pressure welding is electrical and burning of the metal and formation of fins is unlikely.

When welding is begun the facing "straight" annular lips must be in contact so that the current will pass through without arcing. This need for passing the current imports a certain amount of pressure but this is so low that for present purposes it is viewed as without pressure, particularly because it is desired to develop heat in the resistance across from one lip face to the other. Real pressure is unnecessary and may be harmful.

The lips in our invention are simply heated to welding temperature and pressure applied transversely of the weld to cause fusion welding of the lips by their own metal. The danger of incomplete welding of the lips through uneven penetration of weld metal between the lips, which is always present in electric arc welding of the lips, is entirely lacking in the weld of Figures 1 to 3. Sufficient longitudinal movement of the weld members will take place to cause thorough uniting of the lips at the most widely separated point, in case there is any unevenness of contact between the lips prior to the weld.

A further advantage of the weld of Figures 1 to 3 is that the metal exposed to the medium in the pipe (at the bottom of the weld in Figures 1 to 3) is all of the same composition, the composition of the original pipe. No exposure of welding rod metal to the medium in the pipe is possible. This avoids zones of changing metal composition exposed to the medium, which may become foci of corrosion.

The weld of the type of Figures 1 to 3 is particularly useful in piping intended for extremely high pressures and temperatures, such as high pressure steam piping and fittings, oil cracking equipment, and chemical process equipment. It is also desirable for oil and gas pipe lines and for general piping.

The contour of weld groove may be widely varied, for example, to suit different special conditions or views. The weld groove may, for example, have one or more steps as indicated by the step 28 in Figures 1a, 2a, and 3a. The stepped groove in general secures a greater weld area and perhaps, therefore, a stronger union than the unstepped groove.

The weld lips may be formed to extend beyond the contour of the weld members' thickness, as indicated at 22a and 23a, Figures 1b, 2b and 3b. While this has some advantage in the arc welding of the prior art, since the more perfect welding above the lips extends for the full thickness of the members, it is of less advantage when welding by our process because our more perfect welding of the lips secures the needed strength without going beyond the thickness of the weld members.

Usually the small outward bulging 26, Figure 2 (outward with respect to the weld groove, inward with respect to the pipe), resulting from pressure welding the lips, is too small to matter. Sometimes, however, it may be considered preferable to avoid outward bulging beyond the thickness line of the weld members and in this event we may form the lips to be initially slightly above the thickness line of the weld. Thus in Figure 1c the lips 22b and 23b have been so formed that in welding position prior to welding they bend upwardly or inwardly, at 29, with the intent that after pressure welding their downward or outward bulging at 29' will then be merely even or nearly even with the bottom line of the weld members.

The lips may be formed as shown in Figures 1b and 1c by first manufacturing a welding groove as shown in Figure 1 and then deforming the lips to the shape shown in Figure 1b or 1c.

In the broader aspects of the invention, the weld lips are uniformly heated in any suitable way for pressure welding. With gas welding contact of the weld lips need not take place until the lips have been heated to welding temperature but with electric heating the lips should be placed in contact to secure electric current passage and thus heated up to welding temperature before any considerable pressure is applied.

Figure 4 is intended for a diagrammatic showing of our welding process applied to butt welding large pipe sections 20 and 21, and using electric resistance heating or so-called flashing of the opposing straight-ended lips prior to pressure welding the lips together.

The weld members 20 and 21 are presented to one another lip-to-lip in welding position by conductor chucks 30 and 31.

These chucks are electrically connected through heavy conductors 32 and 33 to a suitable heavy duty welding transformer 34. When the primary of the transformer is energized by closing a switch 35 to a suitable source of current, the current of the secondary passing through the weld members and the lips, heats the lips to welding temperature with considerable uniformity throughout the circumference.

As indicated an electrical pyrometer element 36 connected by wires 36' to an indicator-relay 37 is presented toward the heating lips to show when they are at welding heat. The indicator-relay 37, when closed, connects an electrical screw-jack 38 by wires 38' to a source of current to operate the jack and bring pressure on the lips. The jack includes left- and right-hand screws $38^2$ threaded into the chucks 30 and 31.

When the lips are heated to welding temperature, the chucks 30 and 31 are relatively fed a short distance toward one another as by the jack 38, during which time the welding takes place progressively, thereby completing the pressure welding of the lips. The jack will, of course, not continue to feed when the temperature of the joint reduces below welding temperature. When the pressure weld has been completed the primary circuit of the transformer is opened desirably as soon as the jack operates to apply pressure to the weld. A primary current can be put on just before the early arc or other welding to avoid chill and cut off during arc welding.

Though Figures 4 and 5 both are intended to cooperate in automatic feeding, it will be clear that so far as the process is concerned the pressure feed is capable of being applied by hand either by pushing one of the pipes toward the other by hand or by crowbar or other hand operated axial pressure feeding.

After pressure welding the lips, the weld rod welding, suitably electric arc welding, for the main portion of the weld thickness, is proceeded with in any suitable or conventional manner, progressively filling the groove 24 with beads of weld rod metal. A conventional arc electrode of the covered type is shown at 39.

The form of Figure 4 has the distinct advantage over the usual type of flash welding that relatively inexpensive equipment may be employed, for the equipment need not be capable of heating the entire weld section to welding temperature, but only capable of heating the thin lips (which may be even thinner than shown). This feature is advantageous not only in reducing the cost of the welding equipment, but also in making it possible to weld thick sections by portable flash welding equipment.

The electric current may be passed, if desired, through the lips after pressure welding and just before arc welding to avoid chill and thus to improve the quality of the subsequent preferably arc-welding of welding rod material used to fill up the groove. Where the pipe must be grounded, for example, to permit arc welding to a grounded pipe, we plan to interrupt the current through the lips while the arc current is on.

Figure 5 is intended to illustrate diagrammatically our welding process when the heating is effected by combustion extending annularly around the weld groove. The weld members 20' and 21' and chucks 30' and 31' may be in the main as described for Figure 4, except that there is no need for the chuck members to be electrical conductors and the housing structure of one of the chucks has been extended at 40 to support crank structure for angularly shifting the burner.

As shown, an annular burner 41 intended to comprise oppositely diametrally movable semi-circumferential portions, is mounted to surround and rotate along the weld groove 24 and in suitable guide relation with the groove.

The burner 41 presents a succession of relatively spaced burner nozzles 42 directed inwardly upon the lips. The opposing semi-circumferential portions 43 and 43' of the burner are mounted on corresponding carrier members 44 and 45 on opposite sides of one face of a wheel member 46 adapted to turn loosely on one of the weld pipes 20' or 21'.

As illustrated, fuel tanks 47 and 48 for each semi-circumferential burner 43 or 43' are intended to be supported on the corresponding carrier member 44 or 45 and a pyrometer 36 is intended to be supported within or close to the groove between the burners (on one of the semi-circumferential burners 43 and 43'). The wheel 46 carries the pyrometer indicator 37' between the burners. The wheel is intended to be rotated during operation of the burner, by means of a hand crank 49' on a shaft 49 journaling at 50 in the bracket extension 40 from the housing of the chuck 30'. The shaft 49 carries a long gear 51 in mesh with spur teeth 52 on the wheel 46.

During the heating operation the burners are rotated in the plane of the annular groove, causing the flames at the nozzles 42 to follow one another around the groove, thereby avoiding the effect of inequalities of operation at the different nozzles and securing throughout the length of the lips more uniform heating than would be readily possible without rotation or oscillation of the burner.

When the welding temperature has been reached, suitably as indicated by the reading of the pyrometer 36', the chuck members 30' and 31' may be fed toward one another as already described, by a suitable jack as shown in Figures 11 and 12, and as seen diagrammatically in Figure 5, optionally without interrupting the operation of the annular burner until completion of the pressure welding.

Electrical connections are shown in Figure 5 for the purpose only of feeding the chucks 30 and 31 relatively to each other and not for the purpose of arc welding. Since the electrical connections shown in Figure 4 are also for feeding the chucks relatively to each other and not for arc welding the same mechanism shown diagrammatically in Figure 4 can be used in the Figure 5 form.

When pressure welding is complete, if arc welding is intended to be used to fill in the groove, the semi-circumferential burners 43 and 43' are backed off from opposite sides of the weld groove by operating hand wheels 53 on opposite sides of the wheel 46 and the whole wheel structure with the burners is then shifted along the gear 51, thereby carrying the burner away from the weld groove to be out of the way of arc welding. The arc welding operation is then performed as already described, using arc electrodes to progressively fill the weld groove with electrode metal. Instead of arc welding, acetylene weld-rod welding can be used to fill the groove 24.

It will be seen that each of the hand wheels 53 is mounted on a shaft 54 journaling in a lug 55 of the carrier 44 or 45 and is operatively connected by bevel gears 56 and 57 with a screw 58 journaling in a lug 59 of the carrier and downwardly threading at 60 into the wheel structure.

It is intended to use any suitable burner and that illustrated in Figures 6, 7 and 8 is intended to comprise semi-circumferential sections that together surround the weld pipes at the weld groove in suitable close relation to the weld lips. Each section 43 or 43' comprises outer and inner semi-circumferential compartments 61 and 62 for the gases for combustion. Using oxy-acetylene combustion, the outer compartment 61, for example, may be for acetylene and the inner compartment 62 for oxygen; these gases being received through suitable flexible connections not shown from drums 47 and 48. In Figure 5 the drums 47 and 48 are intended to be mounted on the carrier 44 or 45 of the burner, so that in Figure 5 each carrier 44 and 45 is intended to carry two drums, one of acetylene and one of oxygen.

Obviously the fuel drums if desired can be located away from the carriers 44 and 45, the operator then using, however, longer flexible connections to the burner and oscillating the burner back and forth during heating instead of turning the burner continuously in a single direction. The burner will move in an arcuate path following the weld lips, whether it be oscillated or rotated.

Each burner nozzle 42 comprises cooperating units 63 and 64 adjustably threading outer and inner walls 65 and 66 respectively of the burner and each unit 63 and 64 adjustably controlling the admission of acetylene or of oxygen to the nozzle.

The unit 63 comprises a nipple 67 closed at its outer end, adjustably threading the outer wall 65 of the burner and adapted to adjustably close its inner end 68 against the wall 69 separating the burner compartments 61 and 62. The outwardly closed nipple 67 carries an inner tube 70 that is open at both ends and is supported spaced from the inner wall of the closed nipple 67 by suitable longitudinal fins 71. The downwardly directed open end of the inner tube 70 makes a sliding fit through the division wall 69 of the burner.

The acetylene from the outer compartment 61 enters the outer unit 63 near the division wall of the burner, in amount adjustably determined by the position of the unit 63 with respect to the outer wall of the burner. The acetylene passes upwardly outside the inner tube 70 into the upper end of the inner tube to downwardly discharge at the lower end of the inner tube into oxygen that is adjustably admitted into the upper end 72 of the lower nipple 64.

Figures 6 and 7 show the burner in guide relation with somewhat different kinds of weld grooves.

In Figure 6 the burner carries a suitable number of brackets 73 of which one only is shown. These brackets make sliding fit on one of the upper or outer corners of the weld groove.

In Figure 7 the burner at its inner corner is provided with a suitable number of lugs 74, of which one only is shown, and which lugs make sliding fit with a step 75 of the weld groove.

The burner in operating position is in guide relation with the weld groove, extending into the groove but with a clearance at 76 to permit the relative feeding of the weld members one into the other for completion of pressure welding prior to the removal of the burner.

In the structure of Figure 5 the semi-circular burner units are moved to and from operation positions rectilinearly by the operation of the hand wheels 53 on carriers of the burners. This involves considerable structure although it permits very convenient operation of the burner and an easy shifting of the burner soon after the pressure welding has been completed and during an interval in the passage of current through the lips.

We illustrate in Figures 9 and 10 that much of this structure may be dispensed with. The semi-circular burner units fitting around the weld groove are there at one side provided with loose hinge spur and loop connections 77, 78 and at the other side are provided with handles 79 and 80 for manual oscillation of the combined burners after they are in position around the groove.

As seen in Figure 10 the burner units are in partial assembly, one of the units, the upper unit, having been placed in the weld groove and the other unit having been then connected to it loosely at its ends away from the handles, a spur 77 on the end of the upper unit receiving a loop projection 78 of the lower unit. The handles are to be then closed one upon the other, preferably after lighting the lower burner, which will permit the automatic lighting of the upper burner by the hand oscillation of the two burners. After the handles are together they are manually operated back and forth until the weld lips are heated to weld temperature and, suitably while the burner is continuing to operate, the weld members are pressed together to effect the pressure welding of the lips.

One of the burner units preferably carries a pyrometer indicated diagrammatically at 81 and this pyrometer is connected by suitably long flexible connections to an indicator and relay controlling operation of a screw jack as in Figure 4, or to a suitable gauge not shown. The fuel supplies are also brought to the burner units through suitably long flexible connections 82, 83 that may be carried on the respective handles, each unit being provided with a fitting 84 of well known character providing an inlet 85 to the outer compartment of the burner and an inlet 86 to the inner compartment thereof. The fitting 84 is intended to be any suitable fitting offering one connection into the outer compartment of the burner and the other connection into the inner compartment thereof.

The pyrometer 81 is intended to be removably mounted in an open tube 87 extending radially through one of the burner units, as seen in Figure 9. Optionally a number of these open tubes may be provided spaced along each burner unit and to permit checking operations of the burner near its different nozzles. The pyrometers are located in positions between burners, rather than at burners, so as to be affected primarily by the heat of the metal.

Figures 11 and 12 show one structure for feeding the weld units together after their weld lips have been heated to welding temperature and with a diagrammatic showing also of connections for resistance heating of the weld lips.

The supporting structure 88 carries a chuck intended to be any chuck suitable for adequately gripping the pipe, but as shown comprises a divided wedge bushing 90 inside a taper bore 91 of the supporting structure. The structure 88 is provided with hydraulic cylinders 92 at uniformly spaced intervals, three cylinders being shown. The hydraulic rams 93 for these cylinders are on rods 94 that carry at their other ends back of heads 95, chuck-supporting structure 96, the chuck being shown generally similar to that on the main support. A divided wedge bushing 90' surrounds and clamps the pipe, outwardly engaging a taper interior 91' of the supporting structure 96. The supports 88 and 96 of the two chuck members are relatively insulated from one another electrically by insulating collars 97 between the shafts 94 and the structure 96. A pyrometer element 98, optionally of thermocouple type, is shown directed into the weld groove and preferably in contact with the lips, to determine the degree of heating of the lips, and intended optionally also to control thereby the operation of pressure welding.

As illustrated, electrical connections at 99 and 100 are made from the secondary of a suitably heavy duty transformer 101, to opposite sides of the weld members. A source of electrical energy to the primary side of the transformer is indicated at 102.

The pyrometer 98 suitably closes a switch 103 when electrical heating coils 104 (connected to a source of current, not shown) preheat the pipe ends to the desired degree, and the switch 103 remains closed as long as the pipe temperature is above the minimum preheat temperature.

After or when the lips heat to welding temperature, the pyrometer operates a suitable combined switch and relay 103' to shut off or moderate the energy from the transformer. As illustrated, the pyrometer 98 also operates a second combined switch and relay $103^2$, which controls a hydraulic valve 105 for the admission of suitably high pressure fluid, as water or oil, into the hydraulic cylinders 92.

The pyrometer 98 operates the mercury switch in the switch and relay structure $103^2$ to energize an electric magnet having a pole 106 adapted to shift the hydraulic valve element 107. When this valve element moves upwardly in Figure 11, the high pressure source 108 is connected through the valve and flexible connections 109 to the left side of the hydraulic cylinders 92, while the right side of the cylinders is at the same time connected to exhaust through tubes 110, the valve 105 and the tubing 111 from the valve.

The hydraulic rams in operation shift to the right until brought to rest by adjustable stops 112 at the right ends of the cylinders. The degree of movement is made that for effective pressure welding of the lips.

The electrical heating will by this time normally have stopped, either by an automatic control from the pyrometer as shown, or by manual operation, and by means of opening the circuit of the primary of the transformer. The arc welding operation is now proceeded with in the usual manner, filling the weld groove progressively with weld metal as already explained.

In electric welding of the lips there must be contact in order that the current may pass through from one pipe length to the other to effect flash welding; but it is not necessary to have more pressure than gives such contact and it may even be undesirable to have more pressure than this. The heating of the lips may be effected electrically by a combination of heat developed by passage of the electricity from one lip face to the adjacent lip face (flash welding) and the heat developed by passage of electric current through the lengths of the lips themselves—axially of the tubular member or pipe.

If the pressure engagement of the lip contact faces be deprived of its added resistance because of excessive pressure, this contact resistance source of developed heat (flash welding) is removed. For this reason the pressure intended for pressure welding is most desirably not applied until the lip faces have attained a welding temperature at which time welding pressure is applied automatically by use of the pyrometer.

After pressure welding has been effected, if building up the groove by use of welding rods or otherwise follows promptly there is an advantage in maintaining electric current through the welded lips so as to heat the walls of the groove at the bottom of the groove adjacent the lips up to the time the welder strikes his arc and at intervals between arc welding as this makes it easier to apply the molten welding rod material and the welding of the joint made by it is improved in two ways. If the electric current continuing through the lips before the arc is struck makes them very hot, their outwardly radially directed surfaces may be made to blend with the molten welding rod. However the temperature secured by continuing flow of electricity through the lips before the arc is struck may not be nearly sufficient for this purpose. It may nevertheless be beneficial in reducing risk of chill of the molten welding rod metal, therefore improving its hold upon the adjacent metal of the groove.

Obviously the heating effect of electric current through the lips will be reduced just as soon as an appreciable amount of molten welding rod has been applied at the bottom of the groove because the addition of this molten welding rod metal will progressively increase the cross section of the metal adjacent the lips through which the electric current will pass, the current dividing between the lips and this molten metal. For this reason the advantage of continuing electric current through the lips lengthwise of the pipe in preparation for the welding is much greater at the beginning of the welding by means of molten rod than afterward.

The difference between the joint made by the lips and the welding rod molten metal when the lips are highly heated, and the joint made between the molten metal and the original metal of the pipe where this latter has not been separately highly heated would be comparable to the difference between cohesion and adhesion.

In view of our invention and disclosure variations and modifications to meet individual whim or particular need will doubtless become evident to others skilled in the art, to obtain all or part of the benefits of our invention without copying the structure shown, and we, therefore, claim all such in so far as they fall within the reasonable spirit and scope of our claims.

Having thus described our invention what we claim as new and desire to secure by Letters Patent is:

1. In a welding apparatus for butt welding tubular members having a welding groove formed at the meeting ends with cooperating lips at the inside of the weld, means for locally and uniformly heating the lips throughout their annular extent, pyrometric control means responsive to the temperature of heating of the lips, for controlling pressure application to the lips and means put in operation by such pyrometric control means for applying pressure transversely to the weld automatically by reason of a predetermined temperature of the lips.

2. In welding apparatus for butt welding tubular members having a welding groove formed at the meeting ends with cooperating lips at the inside of the weld, means for locally and uniformly heating the lips throughout their annular extent, a thermal responsive element responsive to the temperature of heating of the lips and electric current means altered by the variations in the element during heating of the lips for applying pressure transversely of the weld automatically by reason of a predetermined temperature of the lips.

3. In a welding apparatus for butt welding tubular members having a welding groove formed at the meeting ends with cooperating lips at the inside of the weld, means for locally and uniformly heating the lips throughout their annular extent, a pyrometer heated by the lips adapted to determine the degree of heating of the lips, an electric switch closed by the pyrometer when the lips of the tubular members are heated to pressure welding temperature, an hydraulic valve operated by the closing of the switch and hydraulic ram means put in operation by the valve forcing the lips together to pressure-weld the lips.

4. In a welding apparatus for butt welding tubular members having a welding groove formed at the meeting ends with cooperating lips at the inside of the weld, means for locally and uniformly passing electric current through the lips throughout their annular extent to heat them, a pyrometer heated by the lips adapted to determine the degree of heating of the lips, an electric switch in the circuit of the means for passing electric current opened by the pyrometer when the lips are heated to pressure welding temperature, an electric switch closed by the pyrometer when the lips are heated to pressure welding temperature, an hydraulic valve controlled by the last mentioned switch, and hydraulic ram means put in operation by the valve forcing the lips together to pressure-weld the lips.

5. In a welding apparatus for butt welding tubular members having a welding groove formed at the meeting ends with cooperating lips at the inside of the weld, means for heating the lips to welding temperature, pyrometric means set off when the lips reach welding heat, a valve, means for operating the valve in response to such pyrometric means, and hydraulic means directed by the valve to force the lips tightly together and to pressure-weld the lips.

HERBERT A. BISSOUT.
WILLIAM Y. BORRESEN.

REFERENCES CITED

The following references are of record in the file of this patent:

UNITED STATES PATENTS

| Number | Name | Date |
| --- | --- | --- |
| 2,288,433 | Boetcher et al. | June 30, 1942 |
| 1,984,300 | Cornell | Dec. 11, 1934 |
| 2,137,801 | Geibig et al. | Nov. 22, 1938 |
| 1,467,792 | Holmes | Sept. 11, 1923 |
| 2,042,100 | Houston | May 26, 1936 |
| 1,421,786 | Kamper | July 4, 1922 |
| 2,054,375 | Halle | Sept. 15, 1936 |
| 2,061,287 | Muehl | Nov. 17, 1936 |
| 2,350,716 | Bissout et al. | June 6, 1944 |
| 2,104,749 | Jones | Jan. 11, 1938 |
| 2,037,604 | Spire | Apr. 14, 1936 |
| 2,233,617 | Lamb | Mar. 4, 1941 |